United States Patent
Sagüés

(10) Patent No.: US 9,651,357 B1
(45) Date of Patent: May 16, 2017

(54) SYSTEMS AND METHODS FOR DETERMINING STRAND POSITION IN A POST-TENSIONED TENDON

(71) Applicant: Alberto A. Sagüés, Lutz, FL (US)

(72) Inventor: Alberto A. Sagüés, Lutz, FL (US)

(73) Assignee: University of South Florida, Tampa, FL (US)

( * ) Notice: Subject to any disclaimer, the term of this patent is extended or adjusted under 35 U.S.C. 154(b) by 300 days.

(21) Appl. No.: 14/175,406

(22) Filed: Feb. 7, 2014

Related U.S. Application Data

(60) Provisional application No. 61/761,960, filed on Feb. 7, 2013.

(51) Int. Cl.
G01B 7/30 (2006.01)

(52) U.S. Cl.
CPC ...................... G01B 7/30 (2013.01)

(58) Field of Classification Search
USPC .... 324/207.15, 207.13, 207.11, 200, 207.25, 324/207.2, 220, 251, 207.21, 244, 693; 404/45; 29/452, 897.1; 73/639, 649
See application file for complete search history.

(56) References Cited

U.S. PATENT DOCUMENTS

| | | | |
|---|---|---|---|
| 4,096,437 A | 6/1978 | Kitzinger et al. | |
| 4,531,091 A | 7/1985 | Kusenberger et al. | |
| 4,573,013 A | 2/1986 | Kusenberger et al. | |
| 5,980,246 A * | 11/1999 | Ramsay | A61C 7/06 433/5 |
| 6,300,759 B1 | 10/2001 | Bousack et al. | |
| 6,967,478 B2 * | 11/2005 | Wayman | G01N 27/82 324/235 |
| 7,795,864 B2 | 9/2010 | Barolak et al. | |
| 8,327,709 B2 * | 12/2012 | Daraio | G01N 29/2437 73/632 |
| 2004/0159058 A1 * | 8/2004 | Gulbenkian | E01D 19/14 52/223.14 |
| 2010/0286791 A1 * | 11/2010 | Goldsmith | A61B 17/12022 623/23.7 |

OTHER PUBLICATIONS

Florida Department of Transportation District 3, Mid-Bay Bridge Post Tensioning Evaluation; Corven Engineering Inc.; Oct. 10, 2001.*
University of South Florida, Non-Intrusive method to locate Strand Position in Post Tensioned Tendons, Division of Patents and Licensing, Tech ID#11B157; CopyRight 2011.*
Presuel-Moreno, et al. "Bulk magnetic susceptibility measurements for determination of fly ash presence in concrete", Cement and Concrete Research, 39:95-101, 2009.

(Continued)

*Primary Examiner* — Melissa Koval
*Assistant Examiner* — Nasima Monsur
(74) *Attorney, Agent, or Firm* — Thomas | Horstemeyer, LLP

(57) ABSTRACT

In one embodiment, systems and methods for determining the positions of strands in a post-tensioned tendon involve positioning a magnet in close proximity to the outer surface of a tendon, moving the magnet around the periphery of the tendon, and measuring the force of attraction between the magnet and strands within the tendon at multiple angular positions of the tendon.

20 Claims, 4 Drawing Sheets

(56) References Cited

OTHER PUBLICATIONS

Sagüés, et al. "Validation and Practical Procedure for Vibrational Evaluation of Tendons", Final Report to Florida Dept. of Transportation, Report No. BC353-44, Mar. 31, 2008.
Ciolko, et al. "Nondestructive Methods for Condition Evaluation of Prestressing Steel Strands in Concrete Bridges", NCHRP Project 10-53, National Research Council, 1999.
Kranc, et al. "A Numerical Method for the Recovery of Local Potentials and Currents Due to Corrosion of Steel in Concrete", Journal of ASTM International, 3(2), 2006.
Ciolko, et al. "An Immediate Payoff From FHWA's NDE Initiative", Public Roads, 62(6):10-17, 1999.
Corven Engineering, Inc. "Mid-Bay Bridge Post-Tensioning Evaluation", Final Report to Florida Dept. of Transportation, 2001.

* cited by examiner

SYSTEMS AND METHODS FOR DETERMINING STRAND POSITION IN A POST-TENSIONED TENDON

CROSS-REFERENCE TO RELATED APPLICATION(S)

This application claims priority to U.S. Provisional Application Ser. No. 61/761,960, filed Feb. 7, 2013, which is hereby incorporated by reference herein in its entirety.

BACKGROUND

Post-tensioned construction is a construction technique in which portions of a structure, such as a bridge, are secured to each other using "tendons" that extend throughout the structure. The tendons comprise an outer duct through which steel strands extend. Once the tendons have been placed into position, the strands are tensioned to provide rigidity to the structure.

In order to prevent corrosion of the steel strands and improve mechanical performance, the ducts are filled with a grout material, which typically comprises a mixture of cement and water. When the grout is properly distributed within the duct, it creates a chemical environment that protects the steel. When the grout is not properly distributed, however, corrosion can occur. For example, if air gaps exist within the duct, the portions of the strands within those portions are exposed and may corrode. Alternatively, if the grout is not mixed properly or the mixture separates, regions that only contain water can be formed, which also can lead to corrosion.

There are various methods that can be used to determine if there is a problem with the grout within a duct. For example, there are electromagnetic methods that can be used to measure the dielectric properties of the grout mixture. Acoustic and thermal methods may be feasible as well. Unfortunately, the results that are obtained by such methods can depend upon the position of the strands within the duct. For example, one may obtain a false negative result (negative meaning the grout is not deficient) even if the grout is faulty if the testing is performed on a side of the duct at which the strands are bunched together. Alternatively, an erroneous positive indication of a deficiency (that is, a false positive) may be obtained if the testing is made on a side of the duct were the grout is in good condition, but where the strands are farther away from the sensor because of bunching on the opposite side. An indication of the position of the strands within the duct is therefore necessary for appropriate interpretation of electromagnetic, acoustic, or thermal measurement results. Although the position of the strands within the duct can be determined using x-ray imaging, such a process is complicated, time consuming, and expensive.

In view of the above discussion, it can be appreciated that it would be desirable to have an alternative way to determine the position of steel strands within a tendon used in a post-tensioned segmental structure.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have an alternative way to determine the position of steel strands within a tendon used in a post-tensioned structure. Disclosed herein are systems and methods suited for that purpose. More particularly, disclosed are systems and methods for identifying the distribution of the strands using magnetic sensing. In some embodiments, a magnet traverses the circumference of the tendon and the force with which it is attracted to the strands within the tendon is measured as a function of angular position. That force information can then be used to create a radial plot that provides an indication of the location of the strands within the tendon.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
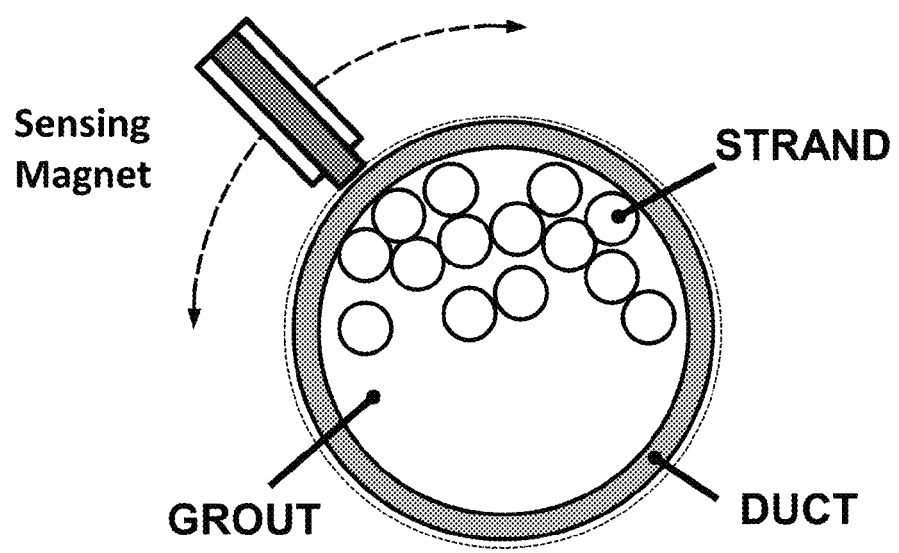
FIG. 1 is a schematic view that illustrates an embodiment of a method for determining the position of strands within a tendon in a post-tensioned structure.

FIG. 1 illustrates in cross-section an example tendon of the type used in a post-tensioned structure. As is shown in that figure, the tendon is comprised of an outer duct, multiple steel strands positioned within the duct, and grout that fills the space within the duct not already occupied by the strands. In the typical case, the duct is made of a polymeric material, the strands are steel cables, and the grout is a mixture of cement and water. As is apparent from the figure, the strands are not evenly distributed across the cross-section of the duct. Instead, the strands are crowded near one side (the top side in FIG. 1) of the duct. This type of crowding is common as the inter-spacing of strands can vary along the tendon depending on the proximity of deviation blocks, the way in which the strands were threaded during initial placement at the time of construction, and deviations from a straight cylindrical shape of the duct as produced or due to gravity deflection.

As noted above, the distribution of the strands within the duct can be identified using magnetic sensing. FIG. 1 illustrates an example of this. Specifically, FIG. 1 shows a sensing magnet that is positioned in close proximity to the outer surface of the duct. As is further indicated in the figure, the magnet can radially traverse (i.e., rotate about) the periphery of the tendon (see dashed arrows) for the purpose of measuring the force of attraction between the magnet and the strands at various angular positions.

Figure 2:
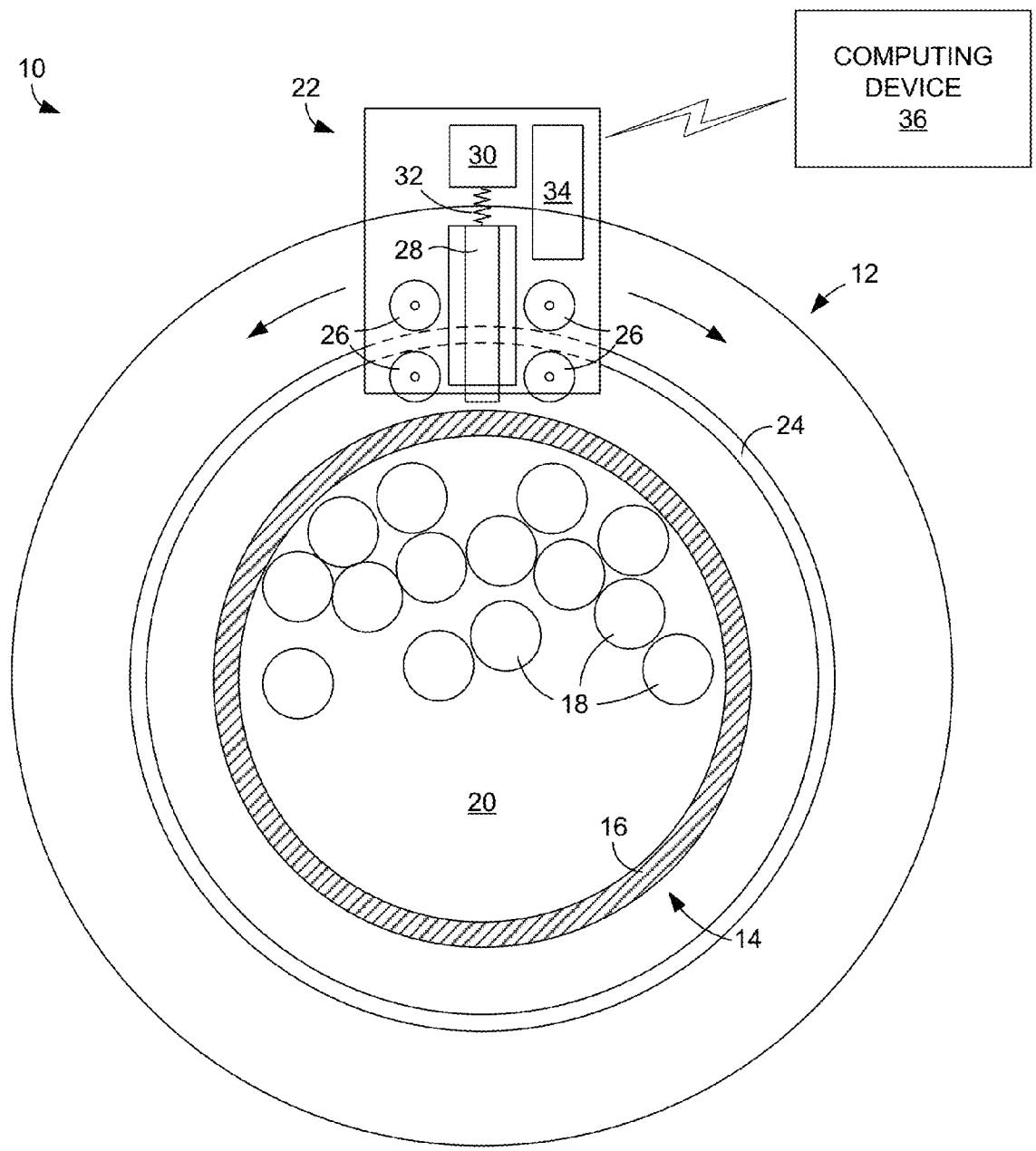
FIG. 2 is a schematic view of an embodiment of a system for determining the position of strands within a tendon in a post-tensioned segmental structure.

FIG. 2 illustrates an example system 10 for determining the position of strands within a tendon. As shown in this figure, the system 10 includes a mechanism comprising a ring member 12 that can be temporarily mounted to a tendon 14 in a desired position along its length. As before, the tendon 14 includes a duct 16 that surrounds multiple steel strands 18 and grout 20. In the illustrated embodiment, the ring member 12 forms a circular track along which a carriage 22 can travel, and therefore rotate around the tendon 14. In the embodiment of FIG. 1, the track includes a circular flange 24 with which one or more wheels 26 of the carriage 22 make contact. In some embodiments, the flange 24 and one or more of the wheels 26 can comprise gear teeth (not shown) that ensure that the carriage 16 does not slip as it travels along the ring member 12. In further embodiments, one or more of the wheels 20 can be driven by a motor (not shown) so that such traversal is automated.

As is further indicated in FIG. 2, a sensing magnet 28 is mounted to the carriage 22. The magnet 28 can travel in a radial direction toward or away from the tendon 14 depending upon the attractive forces generated between the magnet and the stands 18 of the tendon 14. In the illustrated embodiment, the magnet 28 is coupled to a force sensor 30, such as a force transducer, with a spring 32. In such a case, force of attraction between the magnet 28 and the strands 18 can be measured. As is also shown in FIG. 2, the carriage 22 comprises a position sensor 34 that can be used to identify the angular position of the carriage 22 on the ring member 12 (and therefore the angular position along the tendon 14) for purposes of correlating the measured forces with the angular positions. In some embodiments, the sensor 34 comprises an encoder associated with one of the wheels 26 that determines angular position based upon rotation of the wheel.

With further reference to FIG. 2, the carriage 22 and its sensors 30, 34 can be placed in electrical communication with a computing device 36, such as a notebook computer or tablet computer, which can store the measurements and, in some embodiments, determine the positions of the strands 18 based upon the measurements.

While the system 10 has been described as comprising a single carriage 22 and a single sensing magnet 28, it is noted that multiple carriages and/or magnets could be used, if desired. Furthermore, while a motorized carriage 22 has been described, it is noted that the carriage can alternatively be manually displaced along the ring member 12, if desired. Moreover, it is noted that although the system 10 has been described as comprising a force sensor, other parameters could be sensed to obtain an indication of the magnetic force applied to the magnet. For example, a position sensor that senses displacement of the magnet 28 as it interacts with the spring could be used to obtain an indication of the attractive force applied to the magnet.

In use, the ring member 12 can be mounted to the tendon 14 at a particular position along its length and the carriage 22 can travel along the ring member and around the tendon. Multiple force measurements can be obtained at discrete angular positions as the carriage 22 travels and the angular positions associated with those measurements can be recorded. Alternatively, force and angular position can be continuously measured as the carriage 22 travels. Once the entire circumference of the tendon 14 has been traversed, the ring member 12 can be disconnected from the tendon, moved to a new longitudinal position of the tendon, and the measuring process can be repeated. This process can then be repeated for multiple positions along the length of the tendon until all desired measurements have been obtained. Alternatively, the system 10 can operate in a continuous mode in which it moves along the length of the tendon 14 in a manual or motorized fashion and provides a continuous record of output.

For any given longitudinal position of the tendon, the output of the measurement process is a vector of attractive force values at successive angular positions. For example, if force is recorded at 10-degree intervals, a vector with 36 values is obtained. The indication of the strand layout can then be obtained by deconvolution using the vector values and the knowledge of the strand size, the number of strands, and the duct wall thickness. The deconvolution can be performed using procedures of various degrees of sophistication depending on the need for accuracy. In its simplest form, the deconvolution can be based upon the observation that, for a single short magnet with a field that approaches that of simple magnetic dipole, the force between a single strand and the magnet follows an approximately third power inverse dependence with the distance between the magnet and the strand. The force vector can then be converted into a distance vector that, when displayed in a radial plot, yields an indication of the envelope of the strand bundle in the tendon cross-section. The precise value of the power-law exponent (n) can be refined by calibration against information from test specimens with known strand configurations.

Figure 3:
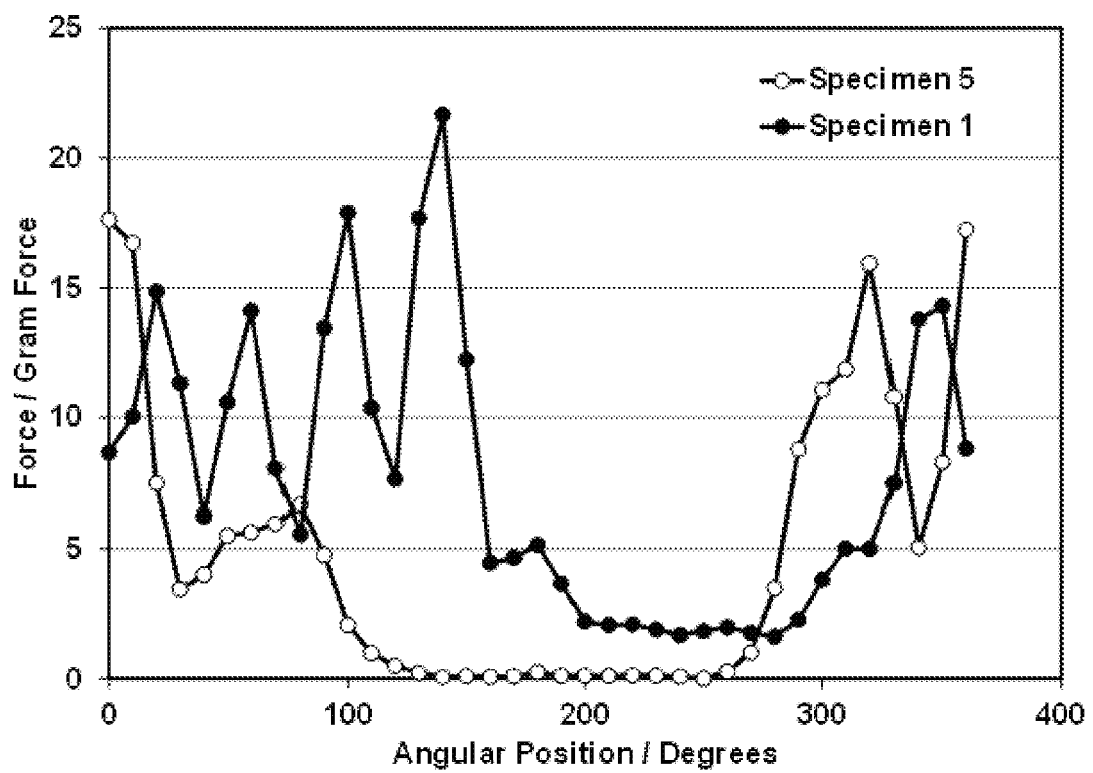
FIG. 3 is a graph of force as a function of angular position measured by a sensing magnet during experiments.
Figure 4A:
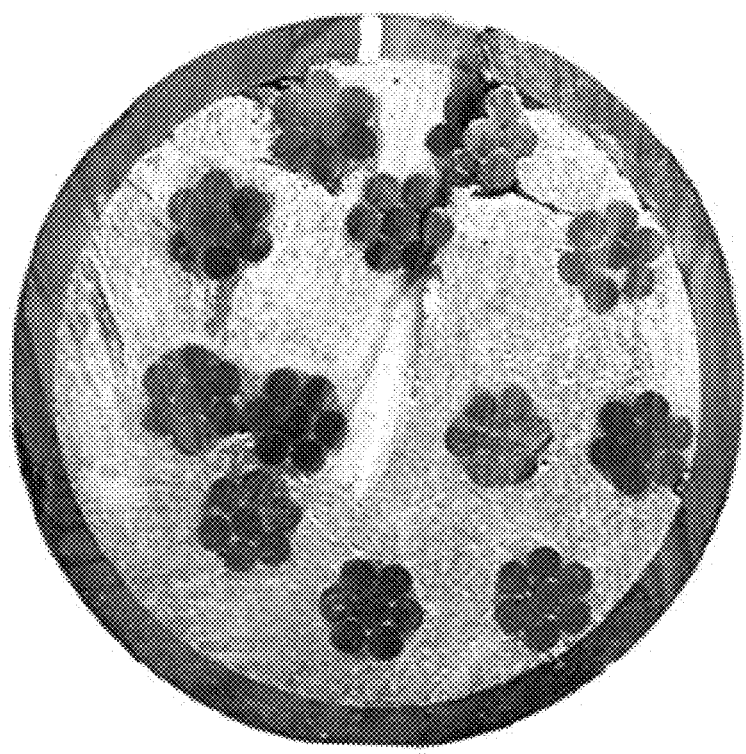
FIG. 4A is a photograph of a cross-section of a first tendon specimen.
Figure 5A:
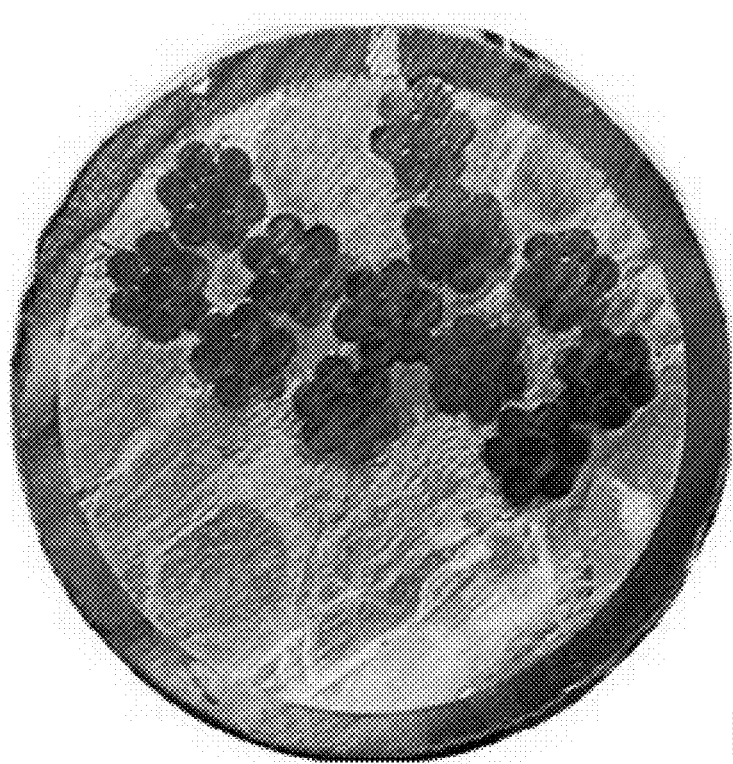
FIG. 5A is a photograph of a cross-section of a second tendon specimen.

Testing of the above-described measurement process and processing technique was performed in the laboratory. For practical purposes, a fixed magnet was used and short (e.g., 1 foot long) tendon specimens were rotated relative to the magnet. The specimens had ducts made of polyethylene having a 3.5 inch external diameter and a 0.22 inch wall thickness. The ducts contained twelve ½ inch, 7-wire post-tensioning strands and grout filled the remainder of the interior space of the ducts. A ⅝ inch diameter, 3/16 inch thick ceramic magnet with magnetization in the direction of the main axis was placed with one of the flat faces approximately 0.04 inches away from the outer duct surface. Force measurements were taken at 10 degree intervals with a digital balance coupled to the magnet. A first specimen had a relatively uniform strand distribution as shown in FIG. 4A and a second specimen had strands crowded near the top as shown in FIG. 5A. Data output vectors for the two test specimens are graphically shown in FIG. 3.

Figure 4B:
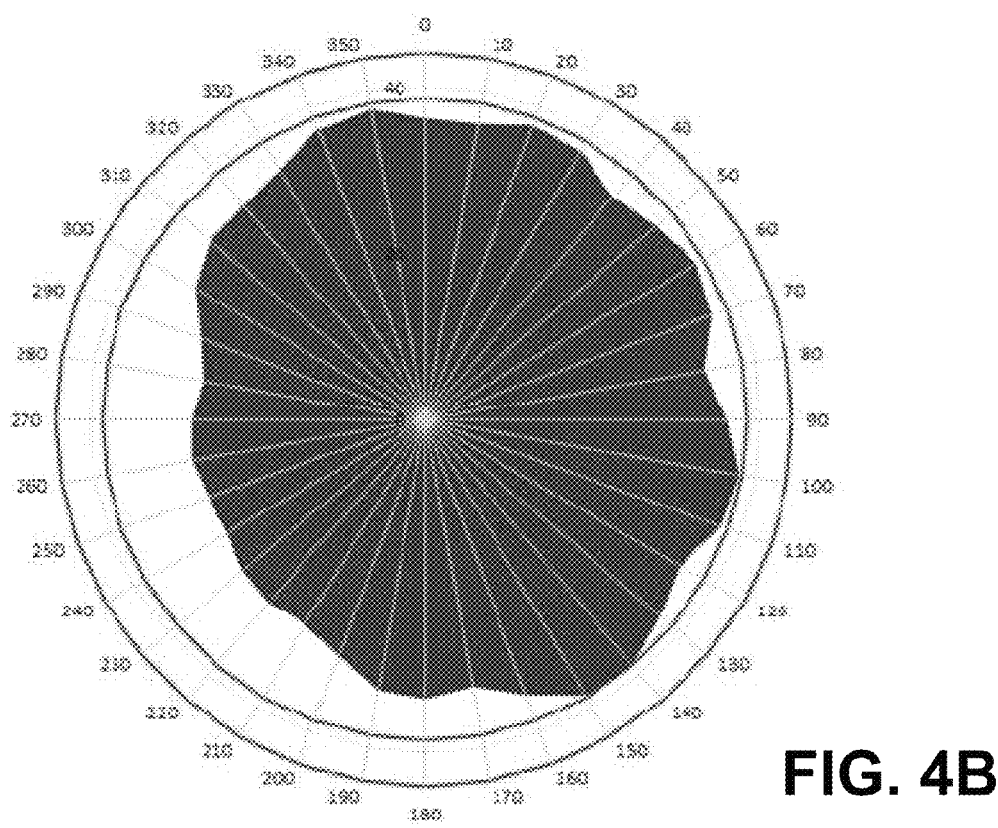
FIG. 4B is a radial plot of strand position generated for the first tendon specimen of FIG. 4A.
Figure 5B:
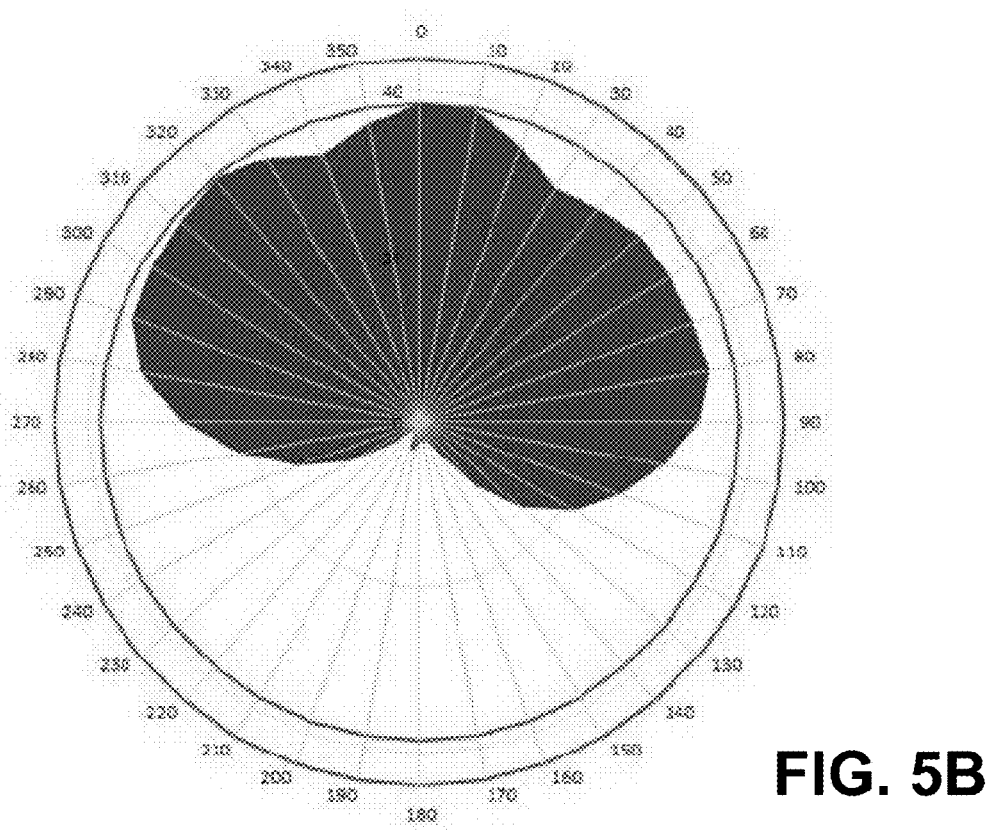
FIG. 5B is a radial plot of strand position generated for the second tendon specimen of FIG. 5A.

Results for the evaluations of the two specimens using the simplified deconvolution method are presented in FIGS. 4B and 5B. A value of n=3 successfully recovered the general shape of the envelope of the actual strand pattern in both tendon specimens, but a value of n=2.5, used to compute the recovered pattern shown in the figures, was found to better quantitatively approximate the actual boundaries of the envelope.

More sophisticated recovery procedures can be used to identify not only the overall envelope of steel placement but also the position of individual strands. Those procedures are implementable by a formal solution of the inverse of the problem of predicting the force profile as function of the strand distribution. The forward problem is amenable to straightforward solution by finite element calculations. As a practical approach to solve the inverse problem, a library of solutions to the forward problem is prepared for a given tendon arrangement (a specific number and type of strands in a given duct diameter) covering a finite number of configurations whereby the position of each strand can adopt a number of discretely separated positions (e.g. on a 3 mm square grid). Because the grout space in the tendon cross-section is usually quite limited (the test specimens, from a research project, were an exception; tendons tend to be more tightly packed), the number of forward solutions to be calculated is limited and is well within the capabilities of ordinary computing equipment. The data output can then be readily compared to the library set of forward solutions by lookup functions to minimize fit error and thus identify the library stand configuration that provides the best match.

A more organized but potentially more challenging approach to solve the inverse problem is to prepare a tractable formulation of the magnetic flux distribution in the system using, for example, finite difference methods and to develop a transfer matrix that relates strand positions to the force-angle profile. Inversion of the matrix then provides for structured solution of the inverse problem.

It is noted that the measurement process described above can be altered in various ways. For example, the strand array can demagnetized prior to measurement. If the strands have permanent magnetization from prior magnetic flux tests or other causes, analysis of the results can be compromised. A degaussing step with a moving coil may be used in those cases and may be built into the examination procedure as a preliminary step.

As another example, alternative magnet configurations can be used. A long magnet can approximate magnetic monopole behavior at one end with lower magnetic field decay with distance than in the case of a short discrete magnet. This difference can be used to advantage to sample with more sensitivity the presence of steel deeper into the cross-section of the tendon. Similarly, an array of small magnets placed at the end of a high magnetic permeability ferrous sheet of material can approximate a two-dimensional magnetic field configuration with even lower field decay with distance and consequently has the potential for deeper sampling. The use of near two-dimensional fields is possible because the axis of individual strands is usually at a very small angle with respect to the main tendon axis. Therefore, over the short distances sampled by the magnetic array, the cross-section strand pattern changes little. Independent scans performed with various magnetic sensor configurations can be combined to provide more detailed spatial strand configuration information at various depth zones.

As a further example, inductance change measurements can be used. The methodology commonly used for rebar location, based on inductance changes of a coil or system of coils when in proximity to steel, can be adapted to the present system in lieu of or as a supplement to permanent magnet sensors. Application of inductive sensors to post-tensioned tendons and deconvolution of the signal for the application at hand along the lines indicated above may have merit.

The invention claimed is:

1. A system for determining the position of strands in a post-tensioned tendon, the system comprising:
   a track adapted to mount to the tendon in a manner in which the track encircles the outer circumference of the tendon; and
   a carriage mounted to the track, the carriage supporting a magnet and a sensor that provides an indication of magnetic forces applied to the magnet, the carriage being positioned on the track in a manner in which the magnet is placed in close proximity to an outer surface of the tendon, the carriage being configured to travel along the track so as to rotate the magnet around the outer circumference of the tendon such that circumferential magnetic force readings can be obtained at a discrete position along a length of the tendon.

2. The system of claim 1, wherein the system comprises an array of magnets.

3. The system of claim 1, wherein the sensor is a force sensor that is associated with the magnet.

4. The system of claim 3, wherein the force sensor is a force transducer.

5. The system of claim 3, wherein the force sensor is coupled to the magnet with a spring.

6. The system of claim 1, wherein the mechanism includes a ring member that mounts to the tendon.

7. The system of claim 6, further comprising a carriage that supports the magnet, wherein the carriage can travel along a track defined by the ring member.

8. The system of claim 7, further comprising a motor that drives the carriage along the track.

9. The system of claim 1, further comprising a position sensor configured to determine the angular position of the magnet relative to the tendon.

10. The system of claim 1, further comprising a computing device in electrical communication with the sensor configured to record data provided by the sensor.

11. The system of claim 10, wherein the computing device is further configured to determine the positions of the strands based upon the recorded data.

12. The system of claim 10, wherein the computing device is configured to generate a radial plot of the tendon that identifies strand positions.

13. A method for determining the positions of strands in a post-tensioned tendon, the method comprising:
   positioning a magnet in close proximity to the outer surface of the tendon;
   rotating the magnet around the circumference of the tendon using a mechanism mounted to the tendon;
   sensing a parameter indicative of magnetic forces applied to the magnet; and
   determining the positions of the strands based upon the sensed parameter.

14. The method of claim 13, wherein positioning and moving a magnet comprises positioning and moving the magnet using a ring member that mounts to the tendon.

15. The method of claim 13, wherein sensing a parameter comprises sensing magnetic force applied to the magnet.

16. The method of claim 15, wherein determining the position of the strands comprises generating a vector of force values at successive angular positions.

17. The method of claim 15, further comprising deconvoluting the vector force values to generate a radial plot that provides an indication of the location of the strands within the tendon.

18. The method of claim 17, wherein the deconvolution is based on an assumption that the force between a single strand and the magnet follows an approximately third power inverse dependence with the distance between the magnet and the strand.

19. The method of claim 13, further comprising demagnetizing the strands prior to sensing the parameter.

20. The method of claim 13, further comprising measuring inductance changes of a coil in proximity to the strands.

* * * * *